Patented Jan. 9, 1951

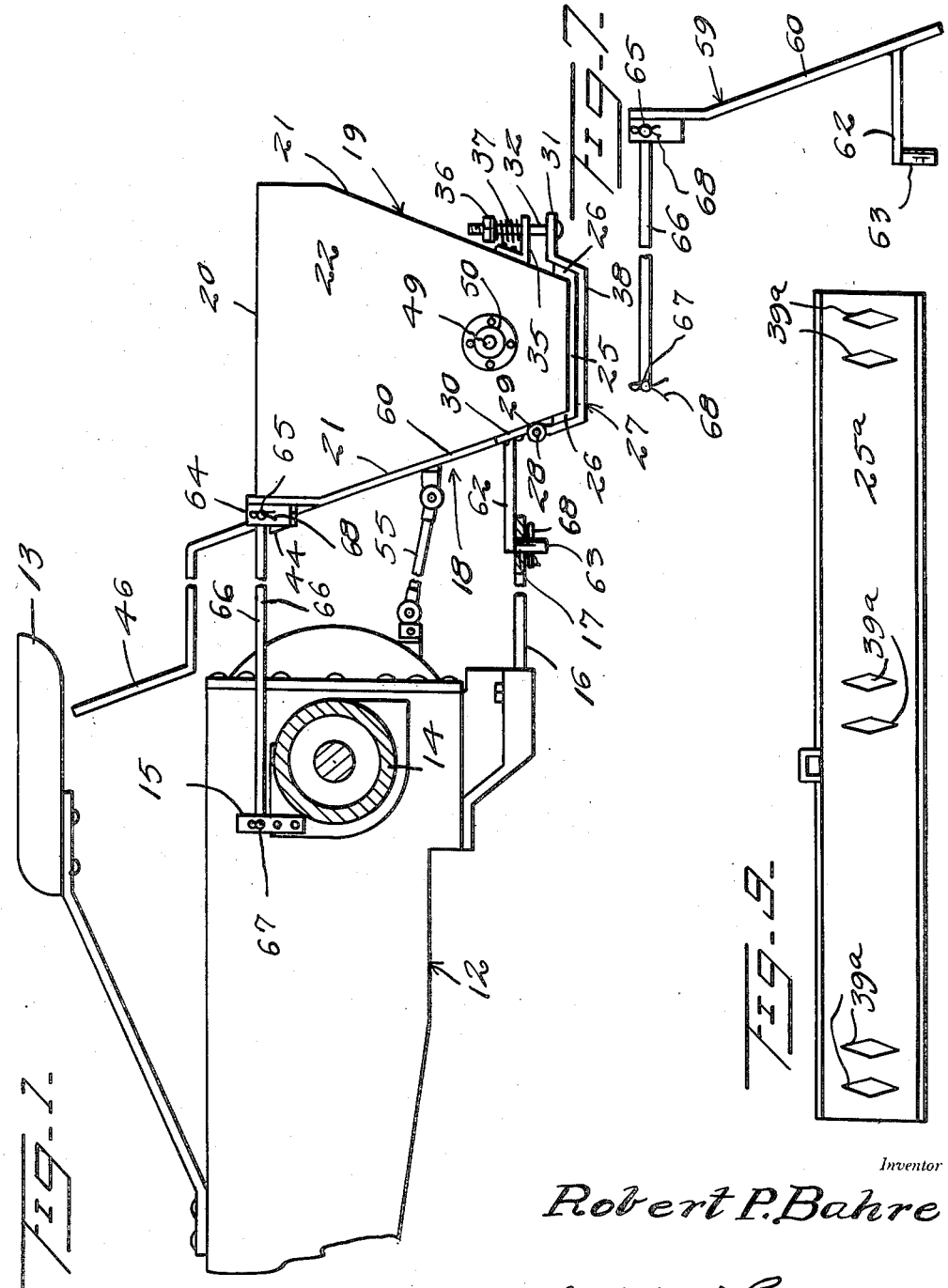

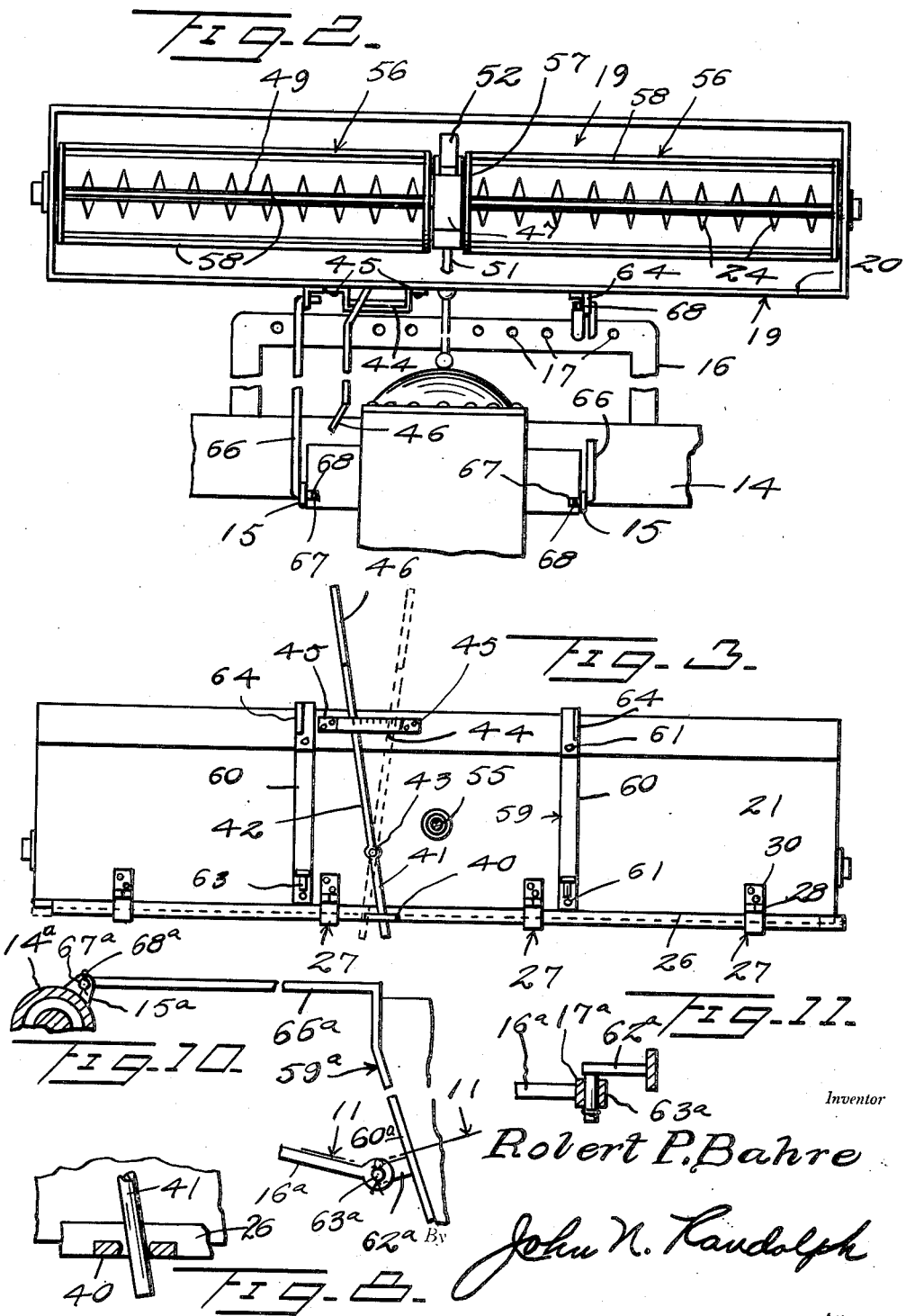

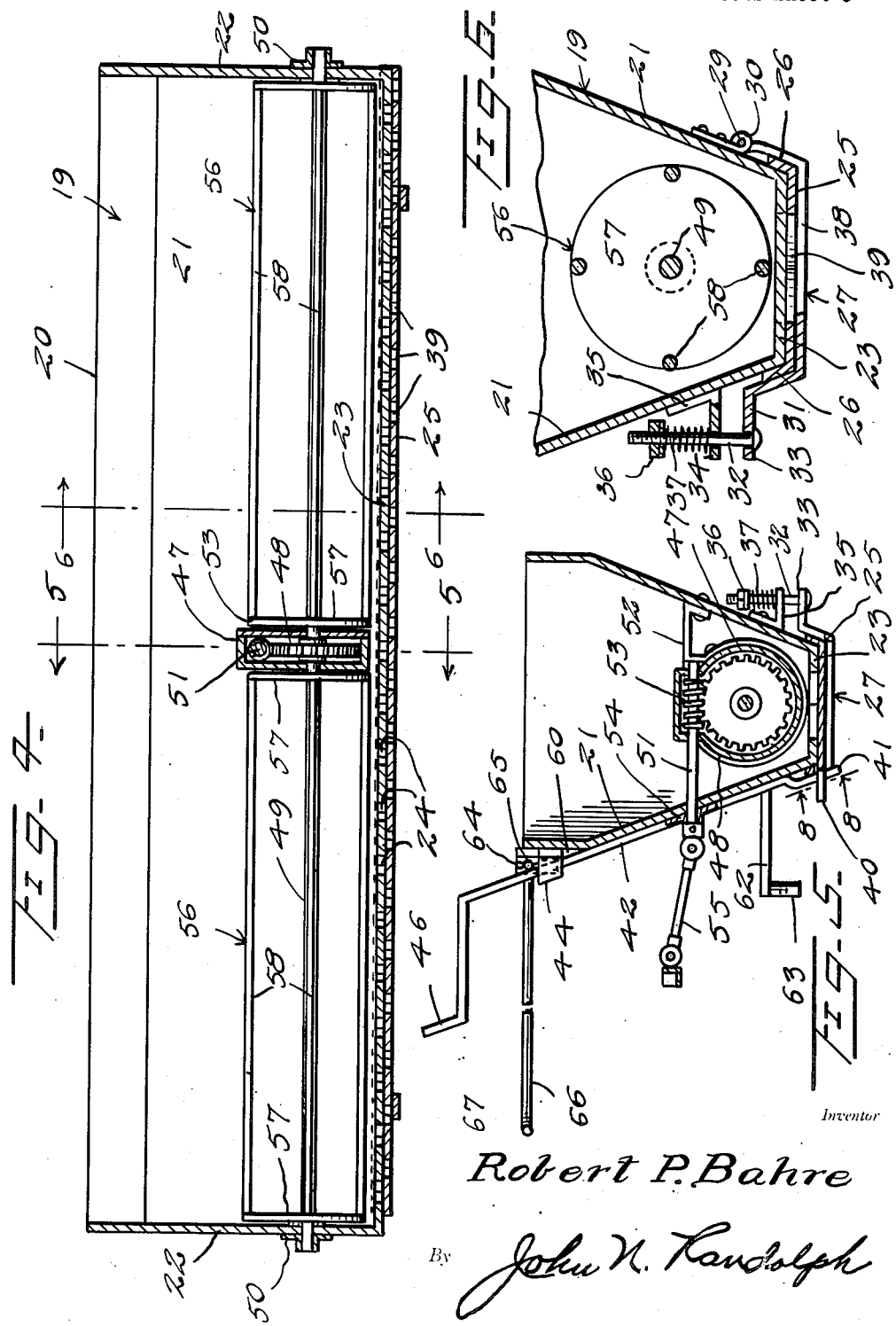

2,537,202

UNITED STATES PATENT OFFICE 2,537,202

TRACTOR MOUNTED DISTRIBUTOR

Robert P. Bahre, Suffield, Conn.

Application October 29, 1948, Serial No. 57,338

1 Claim. (Cl. 275—2)

This invention relates to a distributor attachment adapted to be detachably mounted on tractors for dispensing lime or fertilizer of proper quantities onto a field across which the tractor is moving and provided with agitating means driven by a connection to the power take-off shaft of the tractor for breaking up the lime or fertilizer into minute particles so that it can be readily distributed through the dispensing outlets of the distributor.

Another object of the invention is to provide an agitator adapted to be disposed entirely within a hopper of the distributor thereby enabling the distributor to be disposed much closer to the ground so as to prevent the material being distributed thereby from being blown around by the wind before striking the ground to thus insure proper distribution of the material in the desired places.

Another object of the invention is to provide a distributor wherein the hopper by being located in close proximity to the ground will be disposed with the open top thereof at a relatively low level thereby greatly facilitating the filling of the distributor and eliminating the need for lifting containers of fertilizer or lime to considerable heights in order to empty them into the hopper.

A further object of the invention is to provide a novel mounting for detachably supporting the distributor on a tractor and with the hopper thereof located behind the tractor and transversely thereof and wherein four removable pins are utilized for demountably connecting the distributor to the tractor.

Still a further and important object of the invention is to provide a distributor having means for manually controlling the discharge ports thereof including an actuator located in close proximity to the driver's seat of the tractor so that the distributor discharge ports can be opened or closed by the tractor operator without moving from his position on the tractor thereby effecting a considerable saving in material which would otherwise be wasted while the tractor operator was moving from this seat on the tractor to a position from which the distributor discharge ports could be opened or closed.

Another object of the invention is to provide a distributor having a demountable control valve provided with discharge ports capable of being readily removed and replaced so that control valves having differently arranged discharge ports may be interchangeably used with the distributor for varying the amount of material distributed and for varying the locations with respect to the hopper from which the material is dispensed so that, where desired, the material can be dispensed only onto crop rows along which the tractor is moving.

Various other objects and advantages of the invention will hereinafter become more fully apparent from the following description of the drawings, illustrating preferred embodiments thereof, and wherein:

Figure 1 is a side elevational view of a portion of the rear end of a tractor and showing the distributor demountably applied thereto;

Figure 2 is a top plan view of the distributor including a portion of the rear end of the tractor;

Figure 3 is a front elevational view showing the distributor dismounted;

Figure 4 is a longitudinal, substantially central sectional view through the hopper;

Figures 5 and 6 are cross sectional views of the hopper taken substantially along planes as indicated by the lines 5—5 and 6—6, respectively, of Figure 4;

Figure 7 is a side elevational view of one of the supporting bracket units for demountably attaching the distributor to the tractor;

Figure 8 is an enlarged sectional view taken substantially along a plane as indicated by the line 8—8 of Figure 5;

Figure 9 is a bottom plan view of a modified form of the distributor slide or valve;

Figure 10 is a fragmentary side elevational view showing a modified form of bracket means for demountably supporting the hopper on a "Ford" or "Ferguson" tractor, and Figure 11 is a sectional view taken substantially along a plane as indicated by the line 11—11 of Figure 10.

Referring more specifically to the drawings, a portion of the rear end of a tractor, designated generally 12, is illustrated in Figures 1 and 2 including the operator's seat 13, the rear axle housing 14 having upstanding bracket arms 15 provided with longitudinally spaced apertures, and a rearwardly extending substantially U-shaped draw-bar 16, the intermediate portion of which is provided with longitudinally spaced openings 17.

The parts previously described are all of conventional construction and constitute no part of the present invention. The tractor mounted distributor, constituting the invention, is designated generally 18 and includes an elongated hopper, designated generally 19 which is adapted to be disposed behind and transverse to the tractor 12 and demountably supported thereby as will hereinafter be described. The hopper 19 is provided with an open top 20 through which the hopper can be filled with fertilizer, lime or other material to be distributed thereby, not shown, and said hopper is provided with downwardly and inwardly inclined front and rear walls 21 and substantially parallel end walls 22. The hopper bottom 23, as best seen in Figure 4, is provided with longitudinally spaced discharge ports or openings 24 extending substantially from end-to-end of the hopper 19.

A slide or valve plate 25 is demountably disposed against the underside of the hopper bottom 23 and is provided with relatively short upwardly extending side flanges or walls 26 which are disposed in upwardly diverging relationship for engaging against the lower portions of the front and rear walls 21. A plurality of supporting members 27 support the valve plate 25 slidably against the hopper bottom 23. Each of the supporting members 27 comprises a bar having a looped end 28 which is pivotally connected by a pin 29 to a bracket 30 secured to the hopper front wall 21. Each bar 27 is provided with an opposite outwardly extending end 31 which projects outwardly from the rear wall 21 and which has a headed bolt 32 extending upwardly through an opening 33 therein and through an opening 34 in an outwardly projecting arm of a bracket 35 which is secured to the rear wall 21 and disposed above said portion 31. The bolt 32 is provided with a threaded upper end for receiving a nut and washer as indicated at 36 and which forms a seat for an expansion coiled spring 37 carried by the bolt and bearing on the nut and washer unit 36 on the upper side of the arm of the bracket 35 for yieldably urging the bar portion 31 upwardly. Each bar 27 is also provided with an intermediate portion 38 which is yieldably disposed against the underside of the valve plate 25 for yieldably holding the valve against the underside of the hopper bottom 23. It will be readily apparent that the valve 25 is thus detachably supported by a plurality of the valve supporting units 27 and may be removed from the hopper 19 by removing the bolts 32 to permit the bars 27 to swing downwardly and disengage the valve plate 25 so that said valve plate can be removed for replacement with another valve plate. As illustrated in Figures 4 and 6, the valve plate 25 is provided with longitudinally spaced discharge openings or ports 39 preferably corresponding in size and shape to the ports 24 and which are similarly spaced so that the valve plate 25 by being moved slightly from its position of Figure 4 may be positioned so that each of the ports 39 will register with a port 24 to permit the contents of the hopper 19 to be dispensed through said aligned ports 24 and 39, or by positioning the valve 25 as illustrated in Figure 4, the ports 39 will be disposed out of registry with the ports 24 to prevent the material from being dispensed from the hopper.

The forward side wall 26 of the valve 25 is provided with an outwardly projecting apertured extension 40, as best seen in Figure 8, through which the lower outwardly offset end 41 of an actuating lever 42 loosely extends. The actuating lever 42 is pivotally supported on a pin 43 which projects outwardly from the front hopper wall 21 for swinging movement in a direction longitudinally of the hopper 19 and has an upper portion thereof slidably engaging behind a guide plate 44 which is anchored at both ends thereof, as seen at 45 to the forward side of the hopper 19, the outer surface of which is preferably calibrated to indicate the positions of the openings of the valve plate with respect to the openings of the hopper bottom. The actuating lever 42 is provided with a forwardly offset upwardly extending handle 46 which is disposed beneath and adjacent the operator's seat 13, as seen in Figure 1 and so that it may be readily engaged by the operator from the seat on the tractor for moving the valve plate 25 longitudinally of the hopper 19 for moving the valve openings into or out of registry with the openings of the hopper bottom.

Figure 9 illustrates a slightly modified form of valve plate, designated generally 25a and which differs from the valve plate 25 only in that it is provided with longitudinally spaced series of discharge ports 39a adapted to register with only certain of the ports 24 and which are so arranged that the material dispensed from the hopper 19 may be discharged onto or over crop rows.

A gear box 47 is fixedly disposed in the intermediate portion of the hopper 19 and intermediate of the ends thereof and contains a worm gear 48 which is fixed to an intermediate portion of a shaft 49 which extends transversely through the gear box 47 and longitudinally through the hopper 19 and the ends of which are journalled in bearings 50, supported by the hopper end walls 22. A shaft 51 is journalled in the upper portion of the gear housing 47 and has its rear end disposed adjacent a supporting bracket 52 which is secured to the gear housing and to the rear hopper wall 21 for supporting the gear housing within the hopper. The shaft 51 has a worm 53 fixed thereto and disposed within the gear housing 47 for meshing engagement with the worm gear 48. The forward end of the shaft 51 extends forwardly through a bearing 54 in the front hopper wall 21 and connects with the rear end of a power take-off shaft 55 of the tractor 12 and which is provided with longitudinally spaced universal joints.

An agitating unit 56 is supported in each end of the hopper 19 on each end of the shaft 49. Each agitating unit 56 includes a pair of end disks 57 which are fixed to spaced portions of the shaft 49 and between which extend a plurality of rods 58 which connect with the disks 57 adjacent the peripheries thereof. The rods 58 when revolved with the disks 57 by the shaft 49 will agitate the contents of the hopper 19, not shown, for breaking up any lumpy material and so that the material will be in fine minute form capable of being readily dispensed through the ports 24 and 39.

The distributor 18, in the form thereof as illustrated in Figures 1 to 8, is provided with two corresponding mounting units, each designated generally 59 and each including a bar 60, as best illustrated in Figure 7 which is shaped to fit flush against the front hopper wall 21 and which is secured thereto and transversely thereof by suitable fastening means such as rivets or fastenings 61. Each bar 60 adjacent its lower end is provided with an outwardly projecting arm 62 which extends forwardly with respect to the hopper 19 and which is provided at its forward end with a depending pin 63 adapted to detachably engage an opening 17 of the drawbar 16, as best illustrated in Figure 1. The upper end of each bar 60 is provided with an outwardly extending flange or plate 64 which is apertured to receive an angular end 65 of a rod 66 forming a part of the unit 59 and having a correspondingly disposed angular opposite end 67 which is adapted to extend through an aperture of one of the bracket arms 15, as best illustrated in Figures 1 and 2. The pin 63 and ends 65 and 67 are diametrically apertured to receive cotter pins 68 for detachably retaining said parts in engagement with the drawbar 16, plate 64 and bracket arms 15, respectively. As clearly illustrated in Figure 2, the hopper 19 is thus supported by two of the mounting units 59 on the tractor 12 with the weight of the hopper 19 actually being supported by the arms 62 and with the rods 66 functioning for steadying the hopper to prevent it from tilting forwardly or rearwardly. The hopper 19 is disposed sufficiently behind the tractor 12 so as to be positioned rearwardly of the rear wheels of the tractor, not shown, to enable the hopper to be made of any length and with the ends thereof substantially overlying the tractor rear wheels.

From the preceding detailed description it will be readily apparent that the operator of the tractor 12 can open or close the valve 25 or 25a to permit the contents of the hopper 19 to be dispensed or to shut off the flow of material therefrom without moving from his position on the seat 13. The agitators 56 will break up the material within the hopper 19 into minute particles so that it can be evenly distributed from the aligned discharge ports 24 and 39. It will also be apparent that the agitators 56 may be operated while the valve 25 is closed for breaking up the material before dispensing of the material is begun for the purpose of finely dividing lumpy material or this may be accomplished during the dispensing by driving the tractor in a low gear for increasing the speed of rotation of the agitators. The pressure of the springs 37 will yieldably retain the valve 25 against the underside of the hopper bottom 23 and in either an open or closed position to which it is moved, and as previously described the valve 25 may be readily removed and replaced with the valve 25a or by other valves having differently arranged discharge ports.

The distributor is also adapted for use on "Ford" or "Ferguson" tractors equipped with rearwardly extending, swingably mounted coupling arms capable of being raised or lowered by a power actuated leveller. With this form of the invention, a pair of bracket units each designated generally 59a is employed, each of which, as best illustrated in Figures 10 and 11, includes a bar portion 60a which is secured against the forward wall of the hopper in the same manner as the bar portion 60. Each bar portion 60a is provided with a forwardly projecting arm 62a adjacent its lower end having a laterally projecting pin 63a for engaging an eye 17a of a rearwardly extending coupling arm 16a which is swingably mounted on a tractor, not shown, for vertical swinging movement. The bracket bar 60a is provided with a forwardly extending rod 66a at its upper end the free end 67a of which is turned laterally to extend through an aperture of a bracket 15a which is supported in substantially a vertical plane on the rear axle housing 14a of the tractor. The ends 67a are turnably mounted in the brackets 15a so that the hopper may be raised or lowered by upward or downward swinging movement of the coupling arms 16a. The pins 63a and ends 67a are likewise diametrically apertured to receive cotter pins 68a.

Various other modifications and changes are contemplated and may obviously be resorted to, without departing from the spirit or scope of the invention as hereinafter defined by the appended claim.

I claim as my invention:

A distributor attachment for tractors comprising an elongated hopper adapted to be disposed behind and transverse of a tractor and demountably supported thereon in close proximity to the rear end of the tractor, said attachment including a plurality of mounting units secured to the hopper and each having a forwardly projecting arm provided with a pin for detachably engaging a coupling element of the tractor for supporting the hopper thereon, each of said mounting units also including a forwardly extending brace for detachably engaging another portion of the tractor, said braces being disposed above said arms, an agitator disposed within said hopper and longitudinally thereof, a gear fixed to a part of the agitator, a gear housing contained in said hopper and enclosing said gear, a shaft disposed transversely of the hopper and adapted to be detachably connected directly to and driven by the power take-off shaft of the tractor, and a worm fixed to said shaft and meshing with said gear, said worm being disposed with said gear in the gear housing.

ROBERT P. BAHRE.

REFERENCES CITED

The following references are of record in the file of this patent:

UNITED STATES PATENTS

| Number | Name | Date |
|---|---|---|
| 1,172,005 | Butterfield | Feb. 15, 1916 |
| 1,840,602 | Pender | Jan. 12, 1932 |
| 2,019,385 | Baucom | Oct. 29, 1935 |
| 2,309,086 | Arndt | Jan. 26, 1943 |
| 2,323,995 | Hiroshima | July 13, 1943 |
| 2,334,376 | Bauer | Nov. 16, 1943 |
| 2,350,107 | Gandrud | May 30, 1944 |
| 2,369,755 | Rosselot | Feb. 20, 1945 |
| 2,375,970 | Williams | May 15, 1945 |
| 2,400,646 | Klein | May 21, 1946 |
| 2,410,937 | Harder | Nov. 12, 1946 |
| 2,415,934 | Buehler | Feb. 18, 1947 |